(12) United States Patent
Fye et al.

(10) Patent No.: US 11,767,171 B2
(45) Date of Patent: Sep. 26, 2023

(54) MODULAR LINK CONVEYOR WITH FEATURES FOR ENHANCING THE EFFICIENT CONVEYANCE OF ARTICLES

(71) Applicant: SPAN TECH LLC, Glasgow, KY (US)

(72) Inventors: Stephen C. Fye, Glasgow, KY (US); James L. Layne, Bowling Green, KY (US); Scott Dayton Barbour, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 17/583,785

(22) Filed: Jan. 25, 2022

(65) Prior Publication Data

US 2022/0144553 A1    May 12, 2022

Related U.S. Application Data

(62) Division of application No. 15/551,949, filed as application No. PCT/US2016/019155 on Feb. 23, 2016, now Pat. No. 11,235,933.

(60) Provisional application No. 62/119,634, filed on Feb. 23, 2015.

(51) Int. Cl.
*B65G 17/40* (2006.01)
*B65G 17/08* (2006.01)
*B65G 23/06* (2006.01)

(52) U.S. Cl.
CPC ........... *B65G 17/40* (2013.01); *B65G 17/086* (2013.01); *B65G 23/06* (2013.01); *B65G 2201/0202* (2013.01); *B65G 2207/24* (2013.01)

(58) Field of Classification Search
None
See application file for complete search history.

(56) References Cited

U.S. PATENT DOCUMENTS

| | | | | |
|---|---|---|---|---|
| 5,069,330 A | * | 12/1991 | Palmaer | B65G 21/18 198/834 |
| 6,196,380 B1 | * | 3/2001 | Teuber | B65G 17/40 198/853 |
| 6,371,284 B1 | * | 4/2002 | Pasch | B65G 17/086 198/848 |
| 6,695,128 B2 | * | 2/2004 | Palmaer | B65G 21/18 198/778 |
| 6,725,883 B2 | * | 4/2004 | Guldenfels | B65G 17/086 198/852 |

(Continued)

*Primary Examiner* — Kavel Singh
(74) *Attorney, Agent, or Firm* — Dickinson Wright PLLC; Andrew D. Dorisio (57) ABSTRACT

An apparatus for conveying an object in a conveying direction includes a conveyor comprised of a plurality of modular links adapted for interconnecting to form a chain. At least one of the links comprises a rounded upper portion forming an apical region for contacting and supporting the article for conveyance along at least a forward run in the conveying direction. The at least one link further including a forwardly projecting portion associated with a first transverse connector forming a part of the upper portion and a rearwardly projecting portion associated with a second transverse connector forming part of the upper portion. The first and second connectors may be staggered in the conveying direction and a direction transverse to the conveying direction. Further aspects pertain to a link with an apical engaging structure, and a sprocket with a removable tooth.

11 Claims, 12 Drawing Sheets

(56) References Cited

U.S. PATENT DOCUMENTS 7,624,858 B2 * 12/2009 Delair .................... B65G 17/40
                                                                                      198/853

* cited by examiner

MODULAR LINK CONVEYOR WITH FEATURES FOR ENHANCING THE EFFICIENT CONVEYANCE OF ARTICLES

This application is a divisional of U.S. application Ser. No. 15/551,949, filed on Aug. 18, 2017, which is a national stage of PCT/US2016/019155, filed on Feb. 23, 2016, which claims the benefit of U.S. provisional appl. No. 62/119,634, the disclosure of which are incorporated herein by reference.

TECHNICAL FIELD

This disclosure relates to the conveyor arts and, more particularly, to an enhanced conveyor chain adapted for more efficiently conveying articles.

BACKGROUND

Modular link conveyor chains have enjoyed widespread use in the past several decades as an efficient and effective means of transporting articles. One particular common use of such conveyors is in an arrangement where the articles may adhere to the conveying surface, such as in the case of food products being frozen during conveyance or freshly baked, warm food products, such as breads, cookies, or tortillas. In this type of arrangement, or simply as a matter of a desire for conveyance over a long distance (such as for cooling, drying, etc.) without the need for wasting valuable floor space, it is also common to convey articles using a side-flexing conveyor chain in a spiral configuration (which typically involves driving the chain using sprocket teeth on a rotating central drum, but the drive arrangement may take different forms as well). Regardless of the form of drive, it can be appreciated that driving of the chain along the spiral path with an elevation change requires a significant input of energy, and thus improving efficiency is a matter of significant concern.

Accordingly, there is a need for an improved modular link conveyor that may address any one of these issues or perhaps other different issues that have yet to be identified. The arrangement should be readily adaptable to many different types of conveyors at minimal cost, and potentially applied in u retrofit situation without extensive effort. The arrangement would be especially adapted for use where the articles being conveyed are susceptible to adhering to a flat conveying surface, where there is a need for an efficient transfer of the articles from one conveyor to another, and also in the course of a spiral conveyance.

SUMMARY

According to a first aspect of the disclosure, an apparatus for conveying an object in a conveying direction is disclosed. The apparatus comprises a conveyor including a plurality of modular links adapted for interconnecting to form a chain. At least one of the links includes a rounded upper portion for contacting and supporting the object for conveyance along at least a forward run in the conveying direction. The at least one link further includes a forwardly projecting portion associated with a first transverse connector, a rearwardly projecting portion associated with a second transverse connector, the first and second transverse connectors being non-collinear.

In one embodiment, the first connector includes a first apical region and the second connector includes a third apical region. A third connector includes a third apical region, the third connector being collinear with either the find connector or the second connector.

At least one of the links includes a portion for engaging a drive structure, the portion comprising an apical or rounded surface. The portion may comprise a depending arm including the apical surface. The apical or rounded surface may be provided by a spherical cap.

The drive structure may comprises a tooth of a sprocket. The sprocket comprises a sprocket body including one or more removable teeth for forming the drive structure.

The at least one link may comprise a side link, and another link may form a row of the chain and connected to the side link by the connector. A connector rod is also provided for interconnecting adjacent rows of links to form the chain. The at least one link may further include an upstanding wall for confining objects being conveyed on the upper portion.

According to another aspect of the disclosure, an apparatus for conveying an object in a conveying direction is provided. The apparatus comprises a conveyor comprised of a plurality of modular links. At least one of the links includes an apical engagement surface for engaging a drive structure for driving the conveyor. In one embodiment, the link comprises a depending arm including the apical engagement surface. A member may also be provided for supporting the depending arm, the member including an upstanding projection extending above a conveying surface of the link. The apical engagement surface may be provided by a spherical cap, and may project rearwardly from the link.

A further aspect of the disclosure relates to a conveying apparatus, comprising a conveyor chain and a sprocket comprising a sprocket body including one or more removable teeth for forming a drive structure for driving the conveyor chain. The drive structure may comprise a tooth, and a sprocket body including a socket for receiving and capturing a portion of the one or more removable teeth. The sprocket may be mounted for rotation about a vertical axis, or may be mounted adjacent to an outer side of a curving conveyor chain (which may include at least one link having a rounded surface for engaging a tooth of the sprocket, and may be arranged to travel in a spiral path).

Yet another aspect of this disclosure pertains to an apparatus for conveying an object in a conveying direction. The apparatus comprises a conveyor comprised of a plurality of modular links for interconnecting to form a chain. At least one of the links comprises a substantially smooth, rounded conveying surface, the at least one link including a first connector with a first apical region forming a part of the conveying surface and a second connector with a second apical region also forming part of the conveying surface, the first and second connectors being spaced apart in the conveying direction and a direction transverse to the conveying direction. The first and second apical regions may have substantially the same height, and a third apical region may be aligned in the conveying direction with the first apical region.

Still a further aspect of the disclosure pertains to a conveyor link, comprising a body including a curved upper conveying surface including an S-shaped apical region. A conveyor chain formed of the links is also disclosed.

DETAILED DESCRIPTION

Figures 1, 2:
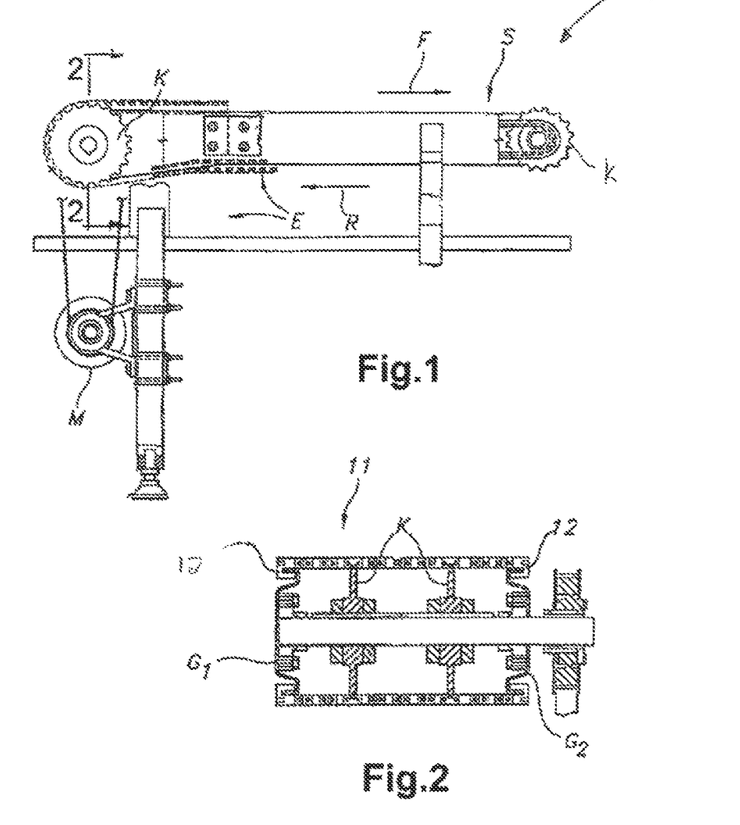
FIGS. 1-4 illustrate a conveyor system to show the environment of use.
Figure 3:
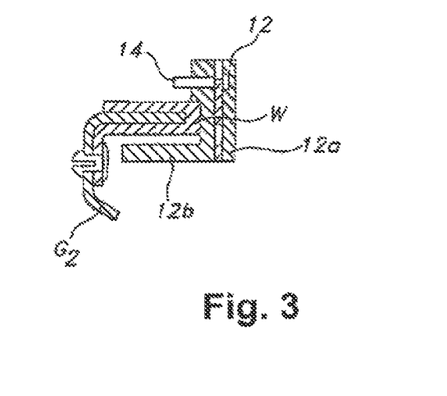
Figure 4:
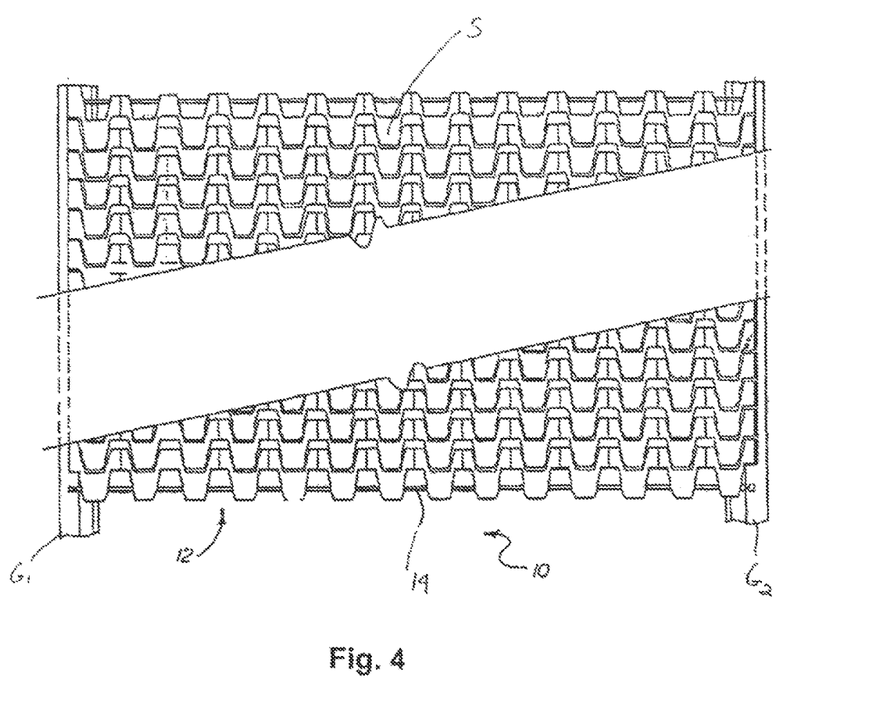

Reference is now made to FIGS. 1-4, which depict one embodiment of a conveyor system 10 adapted for the conveyance of articles, such as in a linear path or along a curved path (including possibly with an elevation change in either case). In this embodiment, the system 10 includes a belt or chain 11 adapted for supporting and conveying objects comprised of a plurality of interconnected modular links 12. The links 12 forming the chain 11 are arranged in rows so as to define a pitch between adjacent rows (that is, the spacing from a location on a link of a first row to a point on a corresponding location on a link of a second row). Each row may include intermediate links sandwiched between specialized side links, which may be adapted (such as by including a depending arm 12a and an inwardly projecting guide tab 12b) to provide a guiding and hold-down function for the chain 12 along spaced guide rails G1, G2 supported by a frame E. As shown in FIG. 3, each guide rail G1 or G2 may optionally include a wear strip W to reduce friction and increase durability.

Adjacent rows of links 12 are connected by transverse connectors 14, which are typically stainless steel rods mounted through matching apertures (e.g. slots having flat lower surfaces and holes) in the adjacent rows and retained by locking tabs. As can be appreciated, this provides the resulting chain 11 with a degree of side-flexing to allow for the more effective negotiation of curves in the system 10 (such as would be present in a spiral conveying configuration). A more detailed description of various examples of such a modular link chain arrangement may be found in U.S. Pat. Nos. 4,953,693 and 5,031,757, the disclosures of which are incorporated herein by reference. However, the present arrangement is not limited to any particular design of modular link chain or conveyor system 10, as the features described herein may find utility in various applications.

In this particular application, the chain 11 is shown as being arranged to travel in an endless conveying path with a conveying surface S for supporting objects (not shown) along a forward run F. In the illustrated embodiment, the conveyor chain 11 is guided between the forward run F and a return run R by end sprockets K mounted along and supported by a rotatable support shaft. The sprockets K are shown as being driven at one end by a motor M, which may be supported by the frame E. However, it is within the broadest aspects of the disclosure for the chain 11 to be driven in a continuous loop in a single (e.g., horizontal) plane, in which case the sprockets could be located anywhere along the path of conveyor travel. Alternatively, as discussed further below, the sprockets K could be arranged to rotate about a vertical axis and engage the side links 12 along an inner or outer side in order to drive the chain 11.

Figure 5:
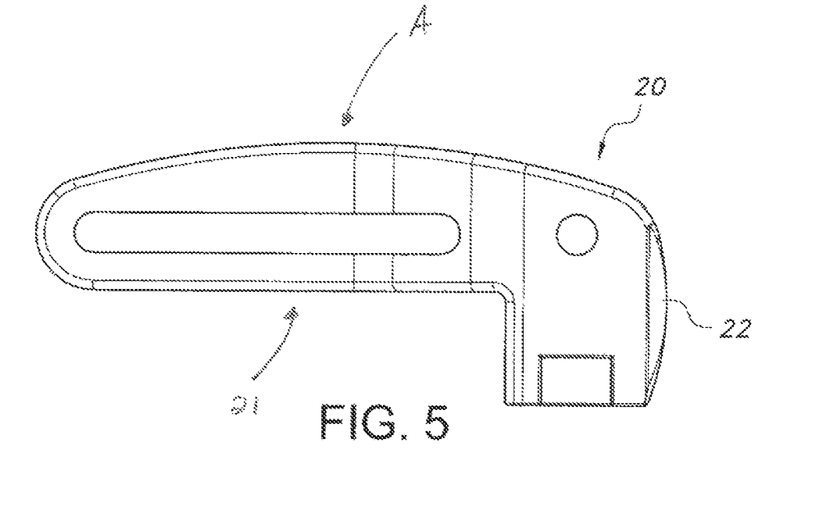
FIG. 5 is a side view of a link according to one aspect of the disclosure.

Turning now to FIG. 5, one or more of the links 12 forming the chain 11 may be adapted in one of several ways to enhance the efficiency of the article conveyance. The illustrated link 12 is provided with a rounded upper portion 20, which thus provides an apical region A for contacting and supporting an overlying article (see article L in FIG. 7). For purposes of this disclosure, the term "apical region" is a region including an apex, or highest point, of the upper surface of the link 12 in the conveying direction. Thus, as will be understood on reviewing the description that follows, a single link may have more than one apical region if the two are spaced apart, such as by a gap. The link 12 may also include a surface opposite the conveying surface S that is planar or flat, and thus contributes to added strength for purposes of transmitting power for driving the link.

Figure 7:
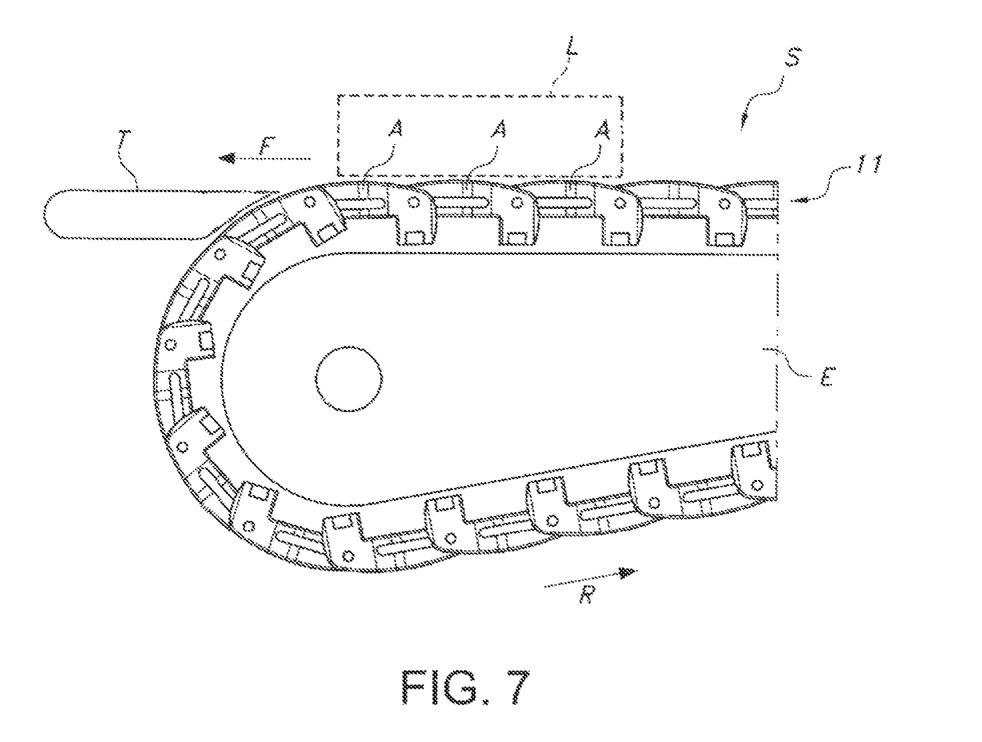
FIG. 7 is a side view of a chain formed of the links.

Consequently, as shown in FIG. 7, when a plurality of the links 12 are arranged in tandem to form the endless chain 11 (which may comprise only a single link width in the direction transverse T to the conveying direction D) for conveying articles, the apical regions A (three identified for example only) of the consecutively arranged links 12, thus serve to provide a discontinuous or undulating conveying surface S for the article L being conveyed (which may be considered a smooth surface with upper and lower regions formed on the same link 12).

As can be appreciated, this apical region A minimizes the amount of contact between the article L and the conveying surface S along the upper portion 20. This may help to prevent deleterious sticking that may otherwise result, especially when the article is, for example, a food product exposed to freezing temperatures during conveyance, or one that has been warmed or just baked (e.g., breads, cookies, tortillas). The minimal contact presented also tends to result in less friction, thus potentially making it easier to alter the path of conveyance, such as through lateral pushing, braking, or the like.

A further result of the rounded upper portion 20 can be understood from the illustration of the transition from the forward run F to the return run R in FIG. 7. At this transition (or the transition from the return to the forward run at the opposite end), the curvature of the upper portion 20 of the consecutive links 12 is such that a substantially smooth, arcuate conveying surface S is presented during travel along the rounded end section of the conveyor system 10. This allows for a transfer T or like structure for transferring the article to an adjacent location (such as a downstream conveyor, not shown) to be positioned extremely close to the conveying surface along the transition. This can be done without the usual concern for irregularities created by "flat top" links making the transition, which would result in a larger gap that could potentially snag the articles and not only cause damage to the article, but potentially lead to a catastrophic failure.

As should be appreciated, the rounded portion 20 is shown as being applied to a link 12 having the depending arm 12a for guiding the chain 11 along all or a portion of the endless path, but could also be applied to links without this structure, as outlined further in the description that follows. A feature of this link 12 is that it provides a substantially open or reticulated conveying surface S, as the result of openings formed in the body of each link. Likewise, there is no continuous central part extending across the surface, but rather connectors 12b extending in the transverse direction T for interconnecting members 12c elongated in the conveying direction D, which together form the leading and trailing apexes 12*d,* 12*e* of the link 12. In other words, at least two of the transverse connectors 12*b* are not collinear (that is, they do not align on the same imaginary line extending in the transverse direction D).

As can be appreciated from FIGS. 6 and 6A-6C, the connectors 12*b* are discontinuous or, stated a different way, staggered in position in the conveying direction For instance, in the illustrated embodiment, one connector 12*b* includes apical region A1, another connector includes apical region A2, which is spaced from apical region A1 in the transverse direction T. Yet another connector includes apical region A3, which is aligned with the first apical region A1 in the conveying direction, but spaced apart from it by a gap P.

Figure 6:
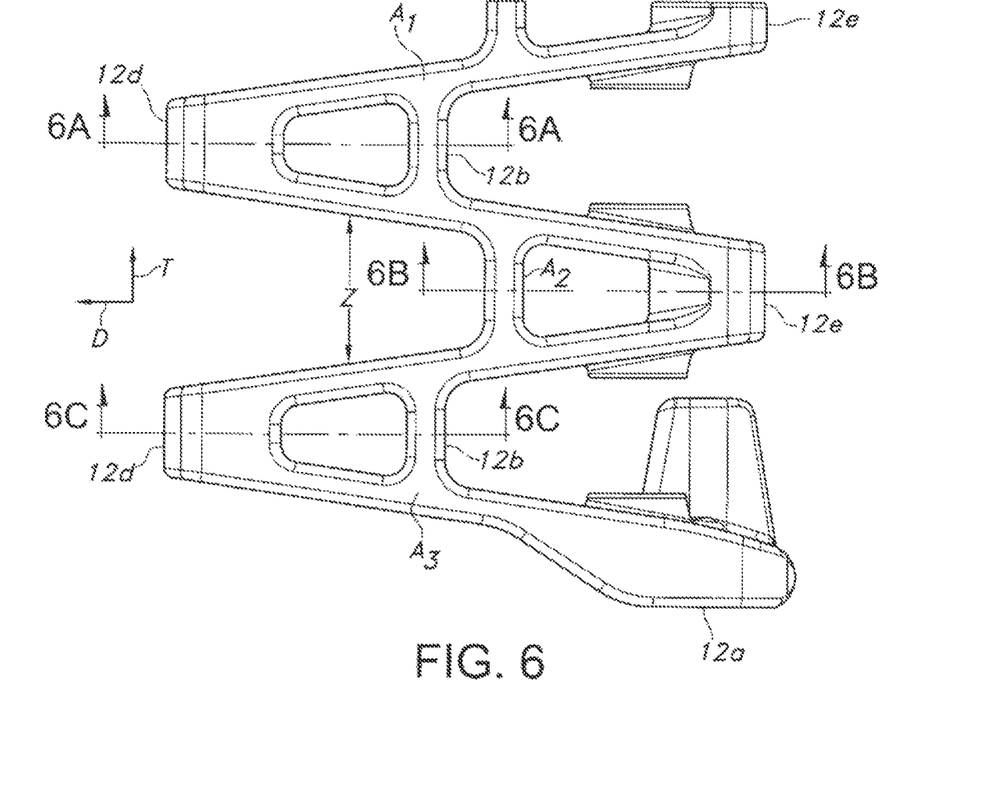
FIG. 6 is a top view of the link of FIG. 5.
Figure 6A:
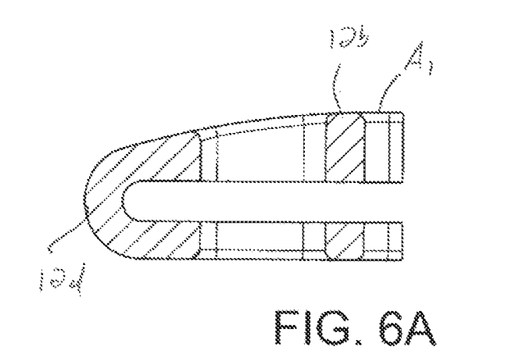
FIGS. 6A, 6B, and 6C are cross-sectional views of the link of FIG. 5.
Figure 6B:
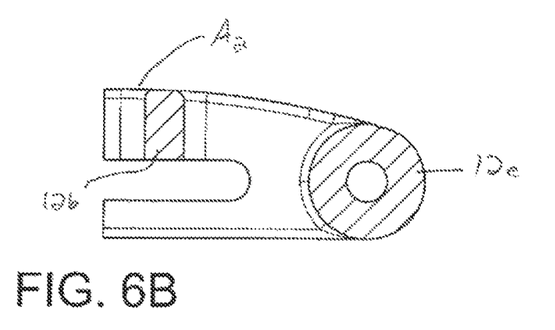
Figure 6C:
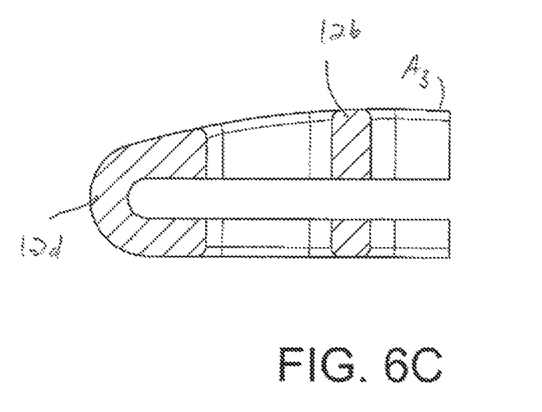
Figure 6D:
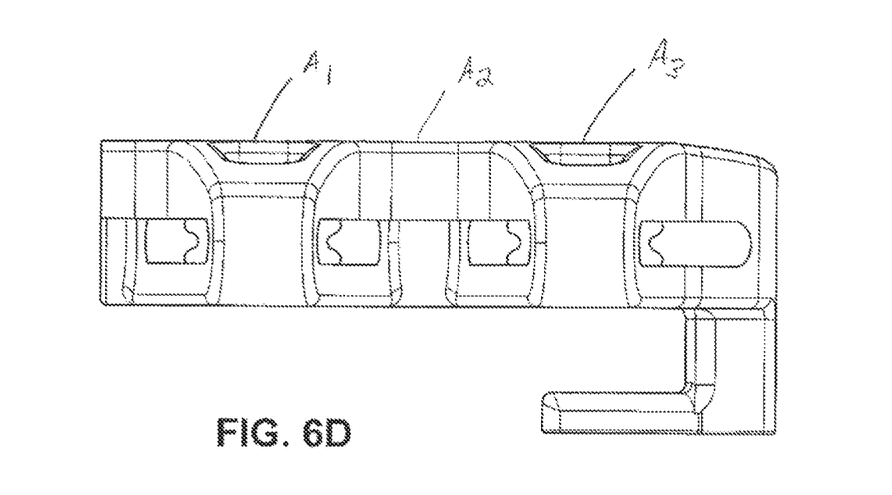
FIGS. 6D and 6E are front and rear views of the link of FIG. 5.
Figure 6E:
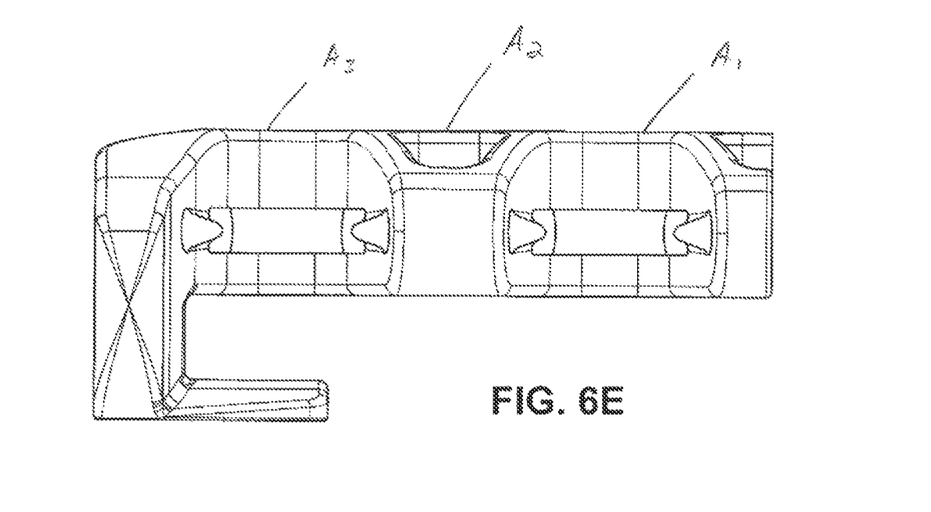

The apical regions A1, A2, A3 may be substantially the same height, or may be different heights, but as noted above, each includes the highest point or apex of the link in tire conveying direction D (that is, there is no higher point when the link is viewed from front or rear (FIG. 6D and 6E). The apical regions A1, A2, A3 may all be of the same height when viewed from the side (although the heights could differ as well). The apical regions A1, A2, A3 forming part of the curved upper portion of the link 12 thus may be considered to be S-shaped when viewed in a top plan view, with the actual highest points of the link being anywhere along the S-shape.

Figure 9:
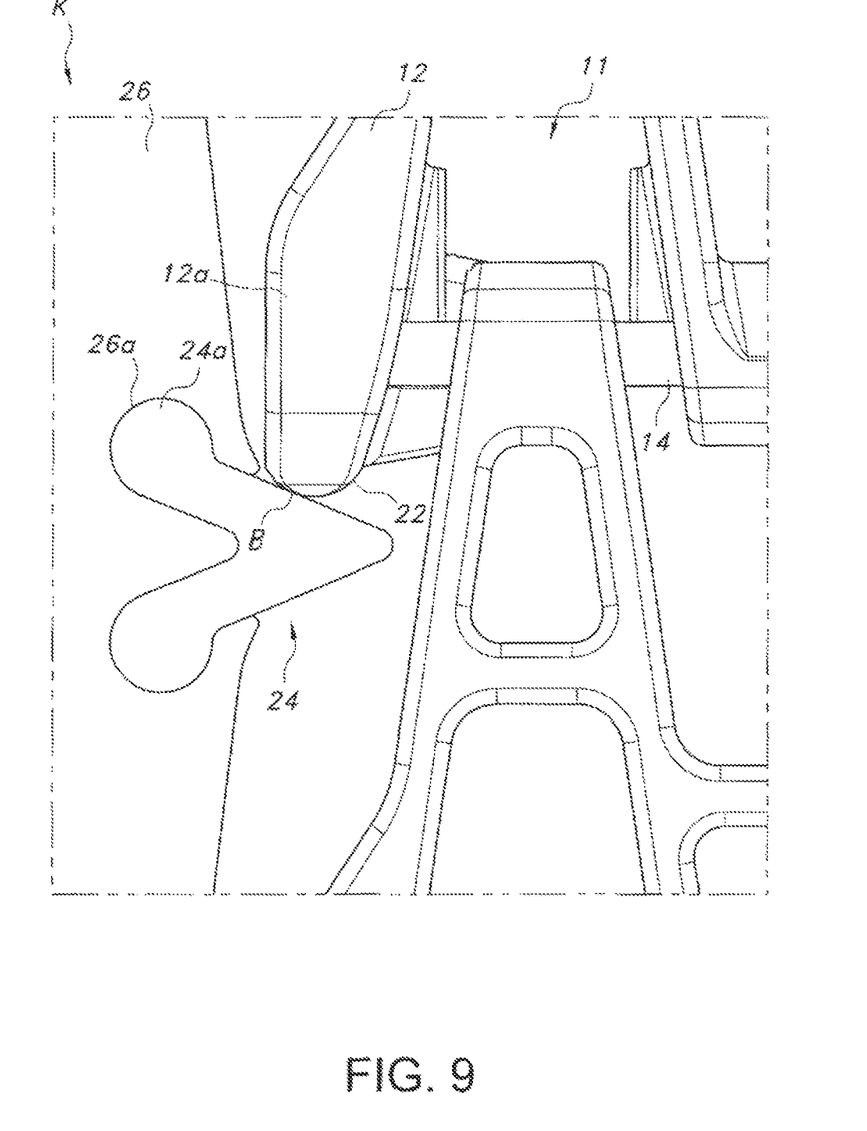
FIG. 9 is a partially cutaway top view showing a drive structure in the form of a sprocket having a removable tooth in connection with the link of FIG. 9.

The foregoing features not only further reduce the amount of contact with articles being conveyed by spacing the apical regions A1, A2, A3, but also tend to allow air to reach the underside of the articles through the gap P, including when the links 12 are interdigitated and especially when the chain is expanded in the conveying direction D (FIG. 9). In situations where heat transfer is desirable during conveyance, such as in the case of warm baked goods, this can significantly contribute to the cooling provided, which may avoid the need for external cooling sources, such as fans or the like, or prolonged conveying runs to allow for suitable cooling time.

A further feature of these or any other links 12 may be to provide an apical contact surface 22 for engaging a drive structure, such as a sprocket 26 (FIG. 8) or the like. As can be understood from the bottom view of FIG. 7, this surface 22 may be arranged on the depending arm 12*a* so as to be rounded. For example, the surface make take the form of a rounded "button," which may take the form of a spherical cap or a hemispherical structure. Alternatively, the surface 22 may comprise a generally pyramidial structure having rounded faces. The surface 22 may be molded as part of the link 12 and thus formed of the same material, or may be formed of a different material (such as an elastomer to provide for enhanced shock absorption and resilience), which may be done through co-molding techniques.

Figure 8:
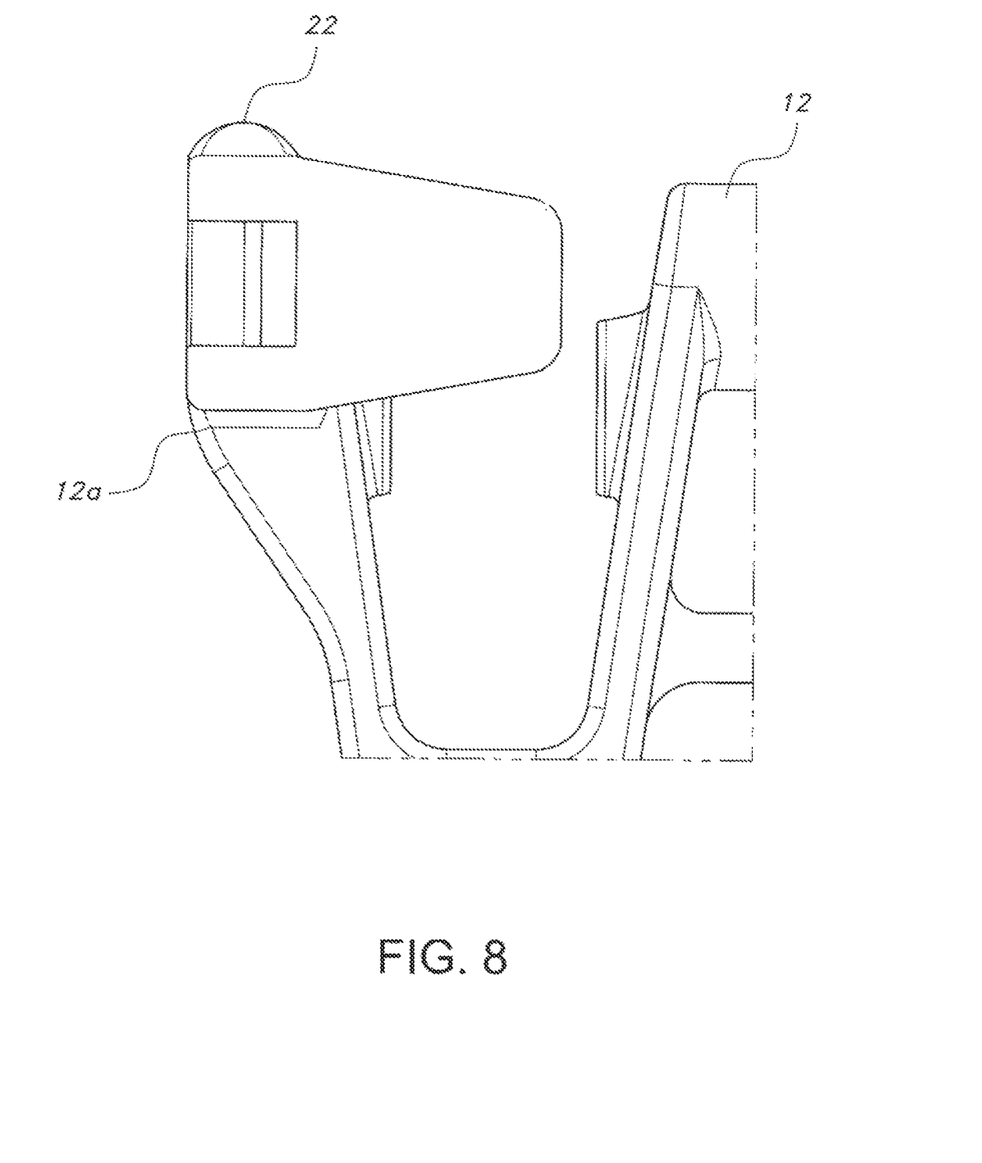
FIG. 8 is a partially cutaway bottom view of the link of FIG. 5.

Thus, as can be understood with reference to FIG. 8, the link 12 is shown in engagement with a tooth 24 of a drive structure, such as a sprocket K (which may be a spiral drive arrangement as illustrated in U.S. Pat. No. 8,727,109 and U.S. Patent Application Publication No. 2014/0305774, the disclosures of which are incorporated herein by reference) arranged so as to have a vertical axis of rotation generally transverse to the conveying direction. As can be appreciated, as a result of the rounded surface 22, the corresponding contact region with the engagement surface of the tooth 24 creates a tangent line at point B during both the initial contact and as the driving in the conveying direction D continues. Consequently, the arrangement provides for an efficient transfer of the motive force during the engagement (as compared to the situation where the contact would be between a sloping surface of the tooth 24 and a fiat surface of the link 12). As a result, efficiency is improved and wear is reduced, thus enhancing the service life of the arrangement.

A further possible feature of this arrangement is to provide the sprocket K with driving inserts removable from the body 26 thereof (such as in a direction transverse to the axis of rotation of the sprocket). Thus, in the FIG. 8 arrangement, the insert is in the form of a generally triangular or pointed tooth 24, which as shown includes oversized portions 24*a* received in and captured by a corresponding receiver 26*a* in the sprocket body 26. The nature of the capturing is such that the tooth 24 is fixed against movement in the radial direction, but can move in the axial direction (and may be held in place by a retainer applied to the sprocket body 26, such as a removable cap). As can be appreciated, this allows for the tooth 24 to be made out of a resilient material, such as polyurethane, while the sprocket K is made of a different material to provide for an enhanced service life. For example, the sprocket body 26 could be made of a harder material, such as anodised aluminum.

Figure 10:
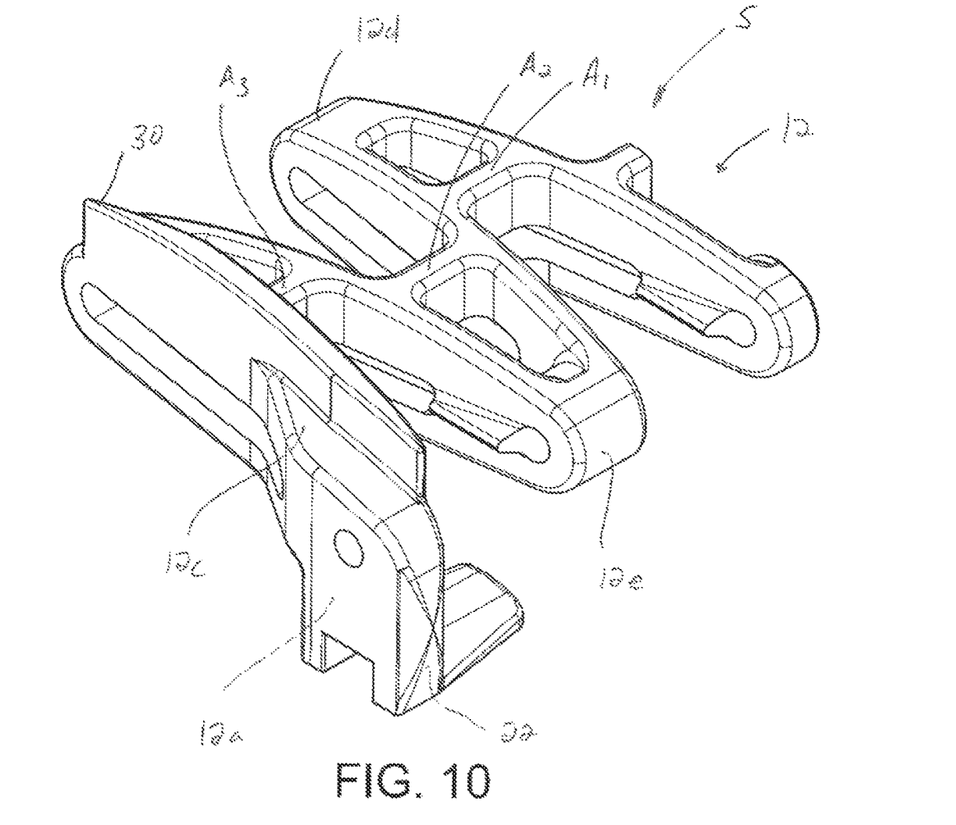
FIGS. 10, 11 and 12 are perspective, side, and top views of another embodiment of a link.
Figure 11:
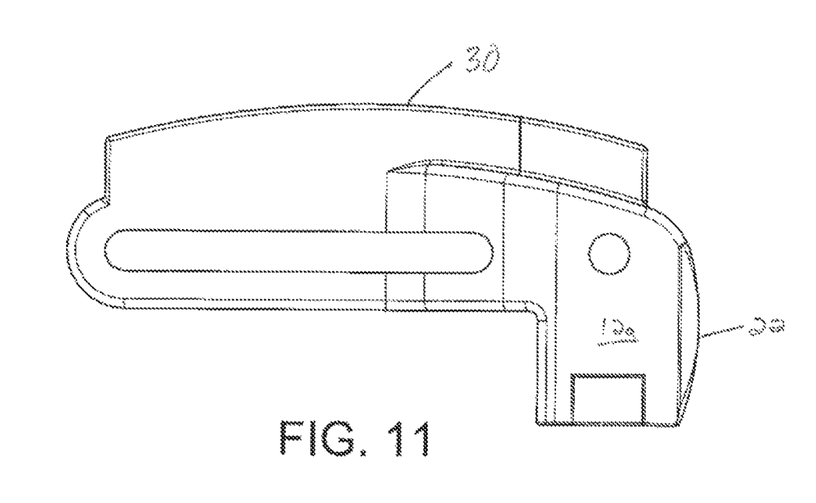
Figure 12:
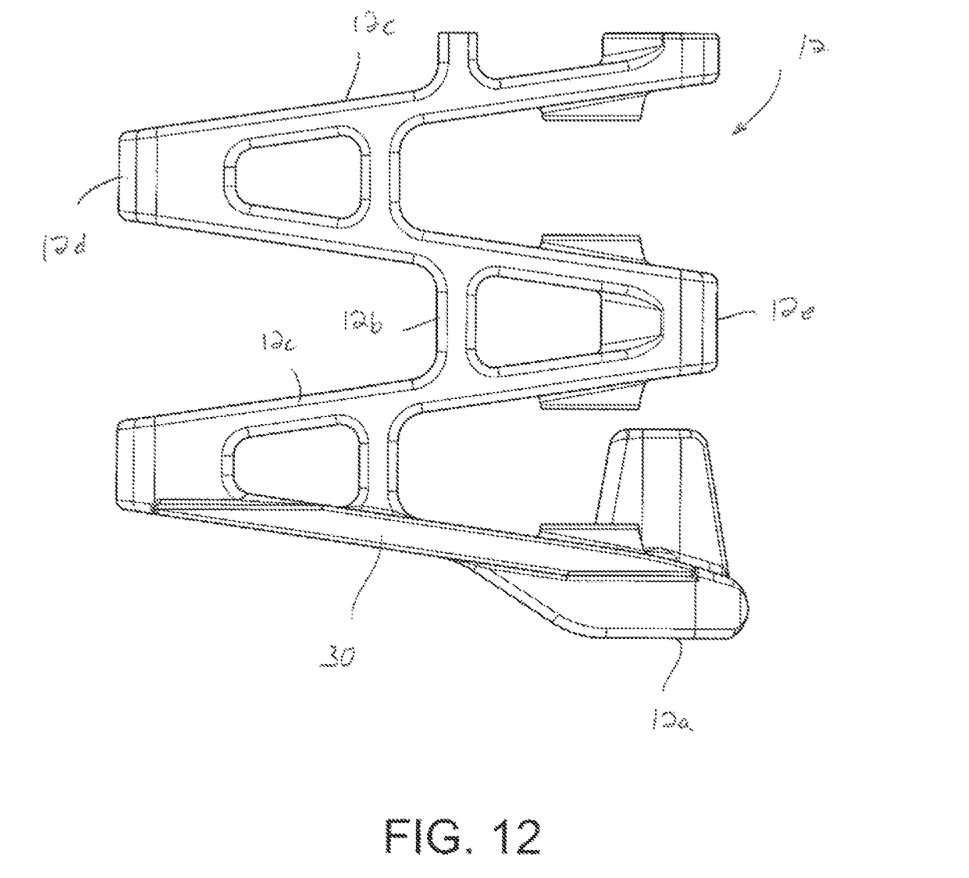

Referring now to FIGS. 10-12, it con be seen that the link 12 may be provided with a raised portion 30 forming an upstanding wall or guard, which is optional. This raised portion 30 may be provided along a side link including depending arm 12*a*, and thus help to confine the articles to the conveying surface S. Additionally, the raised portion may extend along the corresponding member 12*c* to further strengthen the portion of the link 12 against the driving force transmitted by the engagement of a drive structure with the rounded surface 22.

Figure 13:
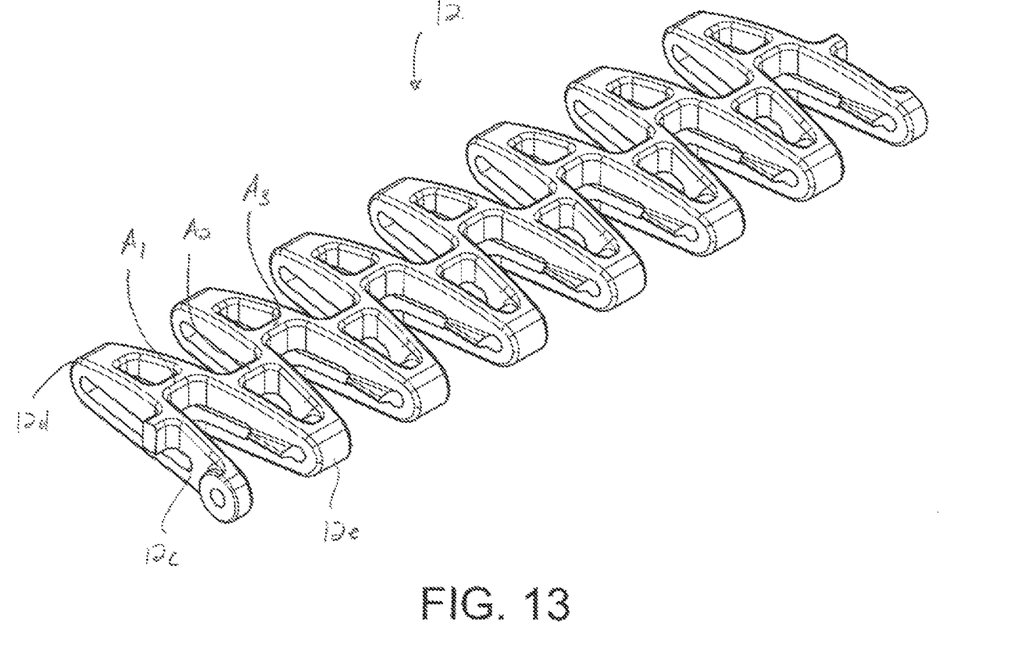
FIGS. 13, 14 and 15 rue perspective, side, and top views of another embodiment of a link.
Figure 14:
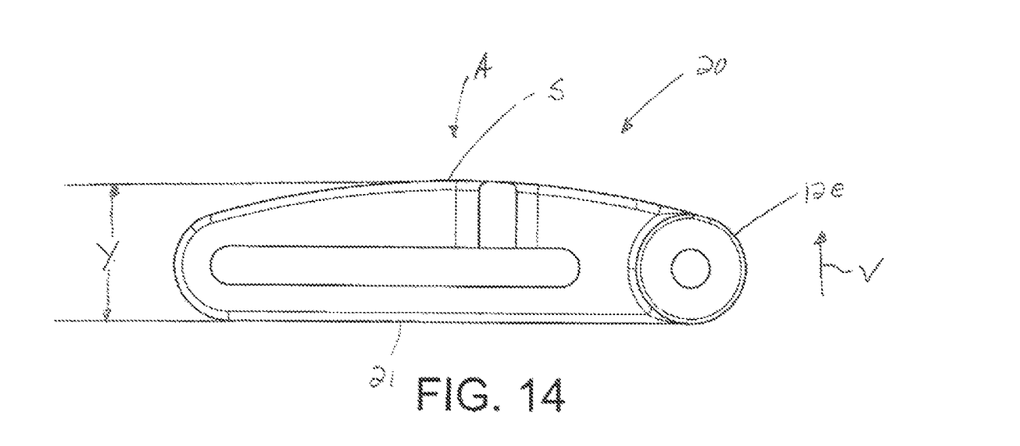
Figure 15:
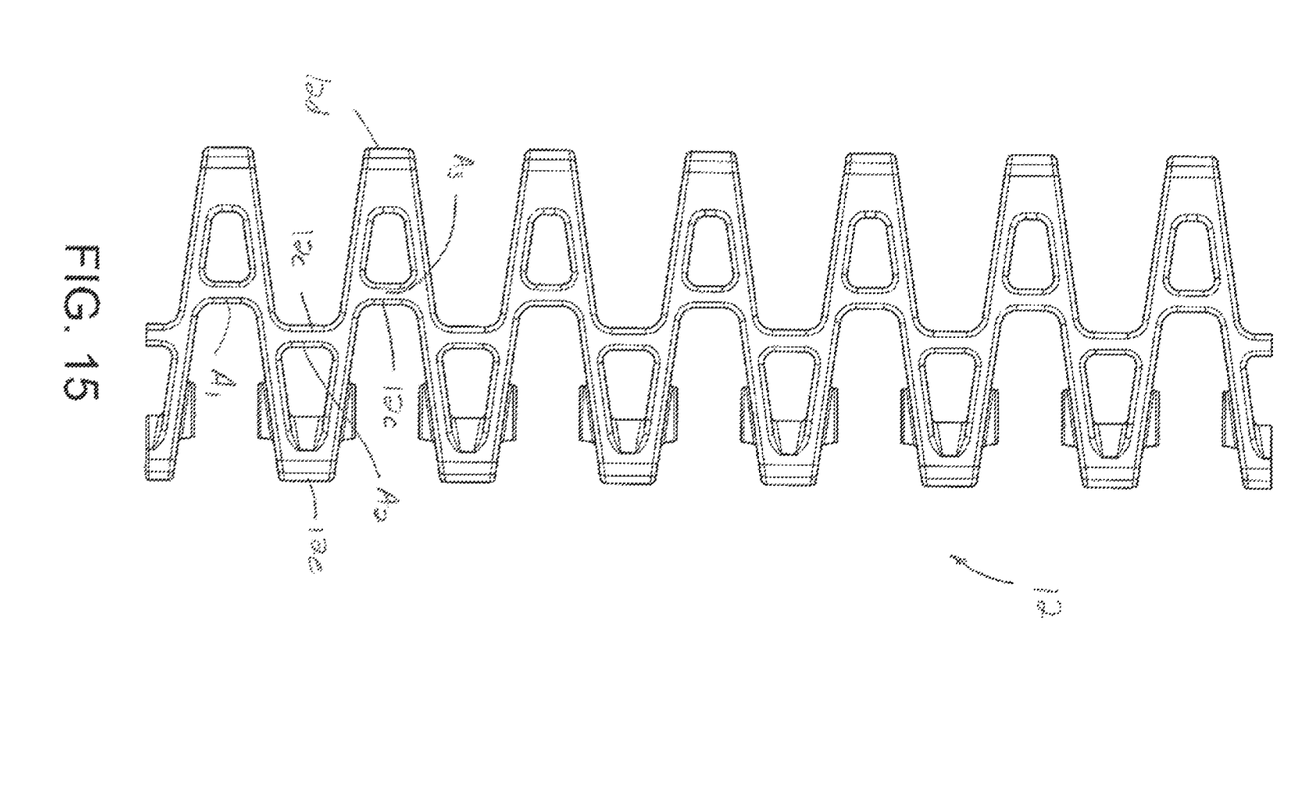

FIGS. 13-15 illustrate a link 12 that is adapted for forming a middle or center link of a conveyor chain. Consequently, the link 12 docs not include the depending arm 12*a*, but does have the rounded or curved portion 20 forming the apical region and the lower planar portion 21 opposite the conveying surface S. The greatest width Y of the link 12 in the vertical direction V is at the apical region A, as indicated in FIG. 14. As can perhaps be best understood from FIG. 15, the central portion of the link is discontinuous in the transverse direction T as a result of the staggering of the connectors 12*b* connecting members 12*c* forming the leading and trailing apex 12*d,* 12*e.*

The foregoing description of several aspects of the embodiments disclosed herein is presented for purposes of illustration and description. The embodiments described are not intended to be exhaustive or to limit the invention to the precise form disclosed. Modifications or variations are possible in light of the above teachings. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. An apparatus for conveying an object in a conveying direction, comprising:
    a conveyor comprised of a plurality of modular links providing a conveying surface for the object being conveyed, at least one of the links comprising an apical engagement surface for contacting a drive structure for driving the conveyor, the apical engagement surface extending outwardly from the at least one of the links.

2. The apparatus of claim 1, wherein the link comprises a depending arm including the apical engagement surface.

3. The apparatus of claim 1, further including a member for supporting the depending arm, the member including an upstanding projection extending above a conveying surface of the link.

4. The apparatus of claim 1, wherein the apical engagement surface is provided by a spherical cap.

5. The apparatus of claim 1, wherein the apical engagement surface projects rearwardly from the link.

6. The apparatus of claim 1, wherein the drive structure comprises a tooth of a sprocket.

7. The apparatus of claim 6, wherein the sprocket comprises a sprocket body including one or more removable teeth for forming the drive structure.

8. The apparatus of claim 1, wherein at least one link includes a rounded upper portion forming an apical region for engaging and supporting the article during conveyance along at least a forward run.

9. The apparatus of claim 1, the at least one link further including a forwardly projecting portion associated with a first transverse connector and a rearwardly projecting portion associated with a second transverse connector, the first and second connectors being staggered in the conveying direction.

10. A conveyor link, comprising:

a body including a curved upper conveying surface having an apical region forming an S-shape.

11. The conveyor link of claim 10, wherein the body includes a forwardly projecting portion associated with a first transverse connector, a rearwardly projecting portion associated with a second transverse connector, the first and second connectors being non-collinear and forming a part of the S-shaped apical region.

* * * * *